United States Patent
Seo

(10) Patent No.: US 8,125,671 B2
(45) Date of Patent: Feb. 28, 2012

(54) IMAGE FORMING APPARATUS AND PDF DOCUMENT DIRECT PRINTING METHOD THEREOF

(75) Inventor: Jung-il Seo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 12/264,463

(22) Filed: Nov. 4, 2008

(65) Prior Publication Data

US 2009/0128845 A1  May 21, 2009

(30) Foreign Application Priority Data

Nov. 19, 2007  (KR) ........................ 10-2007-0118073

(51) Int. Cl.
*G06F 3/12* (2006.01)
*G06K 15/02* (2006.01)

(52) U.S. Cl. ........................ 358/1.15; 358/1.1; 358/1.2

(58) Field of Classification Search .................. 358/1.2, 358/1.16, 404, 1.6, 1.15, 1.1; 709/227; 717/134; 703/22
See application file for complete search history.

(56) References Cited

U.S. PATENT DOCUMENTS

| 7,080,147 B2 * | 7/2006 | Wang et al. | 709/227 |
| 7,551,313 B2 * | 6/2009 | Kuroki | 358/1.2 |
| 7,948,651 B2 * | 5/2011 | Truong et al. | 358/1.6 |

* cited by examiner

*Primary Examiner* — Charlotte M Baker
(74) *Attorney, Agent, or Firm* — Stanzione & Kim, LLP

(57) ABSTRACT

A PDF (portable document format) document direct printing method of an image forming apparatus having a memory, the method includes comparing a size of the PDF document with an available capacity of the memory; transmitting the PDF document that is larger than the available capacity of the memory to at least one external device if a determination is made that the size of the PDF document is larger than the available capacity of the memory; receiving the PDF document from the external device, and forming an image corresponding to the received PDF format.

23 Claims, 6 Drawing Sheets

FIG. 1A
(CONVENTIONAL)
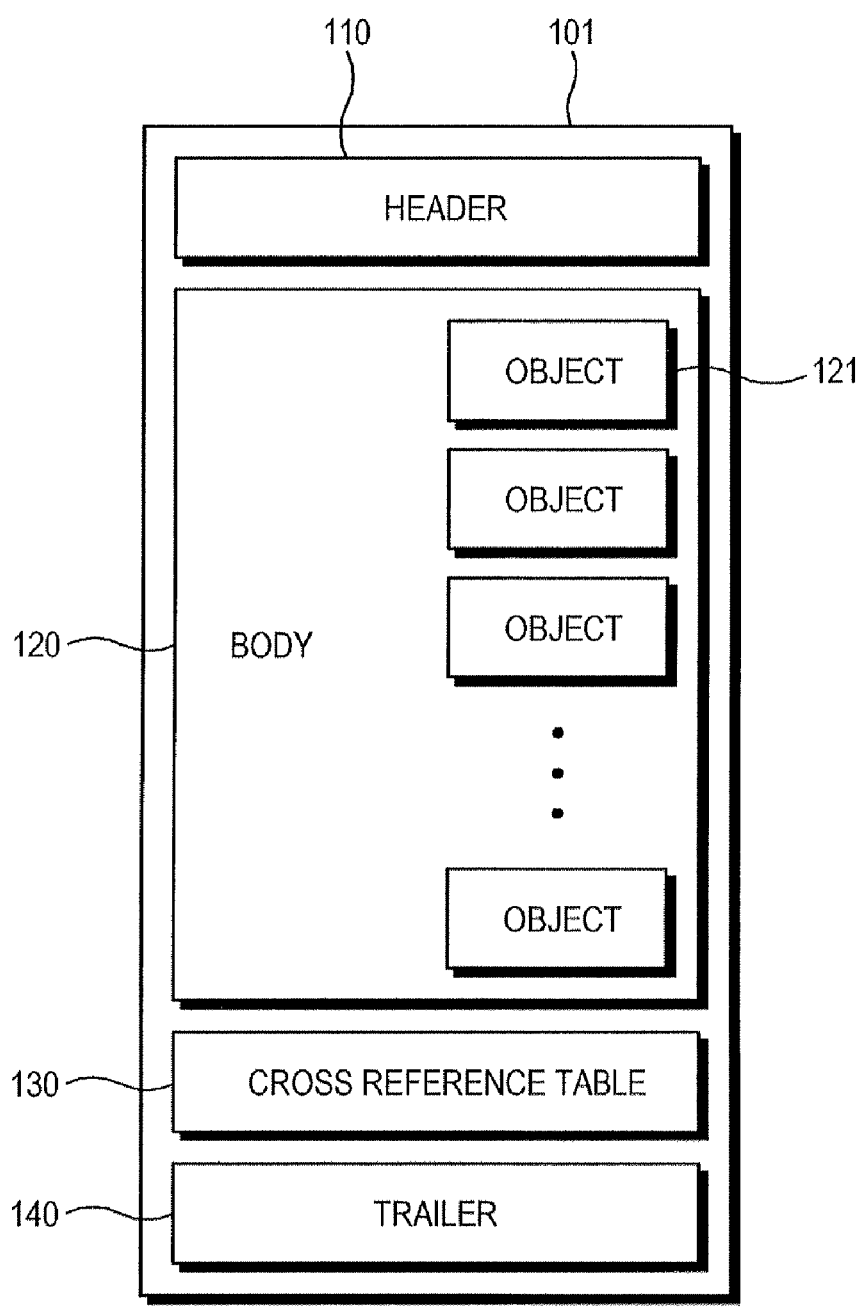

FIG. 1B
(CONVENTIONAL)
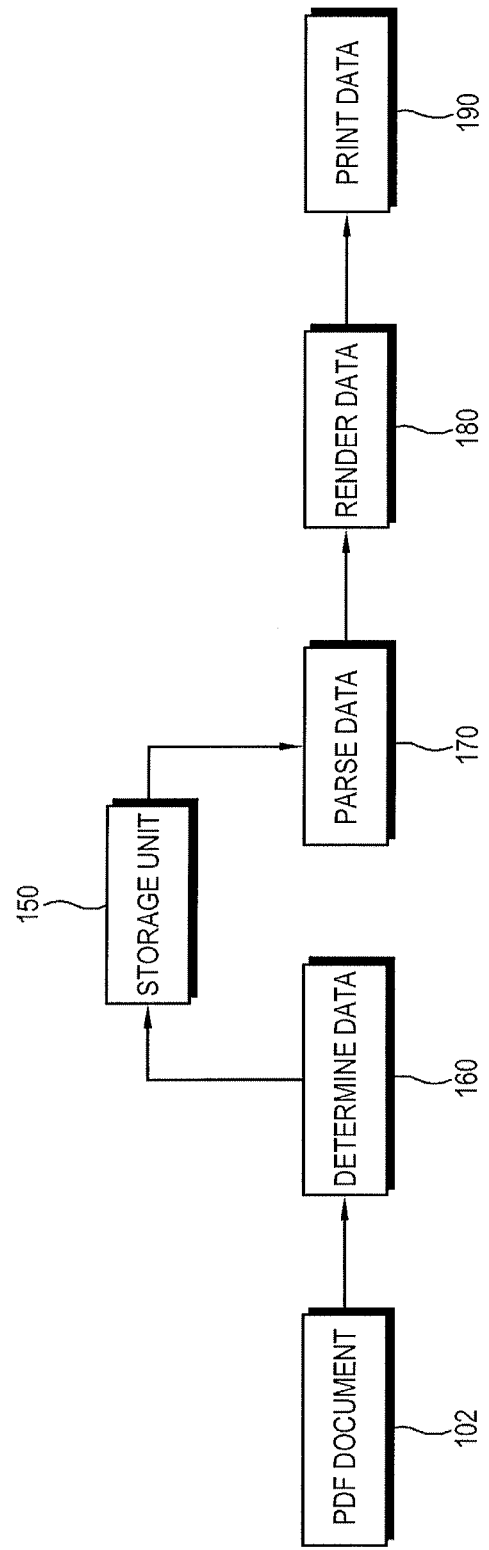

FIG. 3A

| IP ADDRESS | START OFFSET | END OFFSET |
|---|---|---|
| 192.120.16.43 | 0x12121212 | 0x78787878 |
| 192.120.16.44 | 0xdddddddd | 0xeeeeeeee |
| ⋮ | ⋮ | ⋮ |

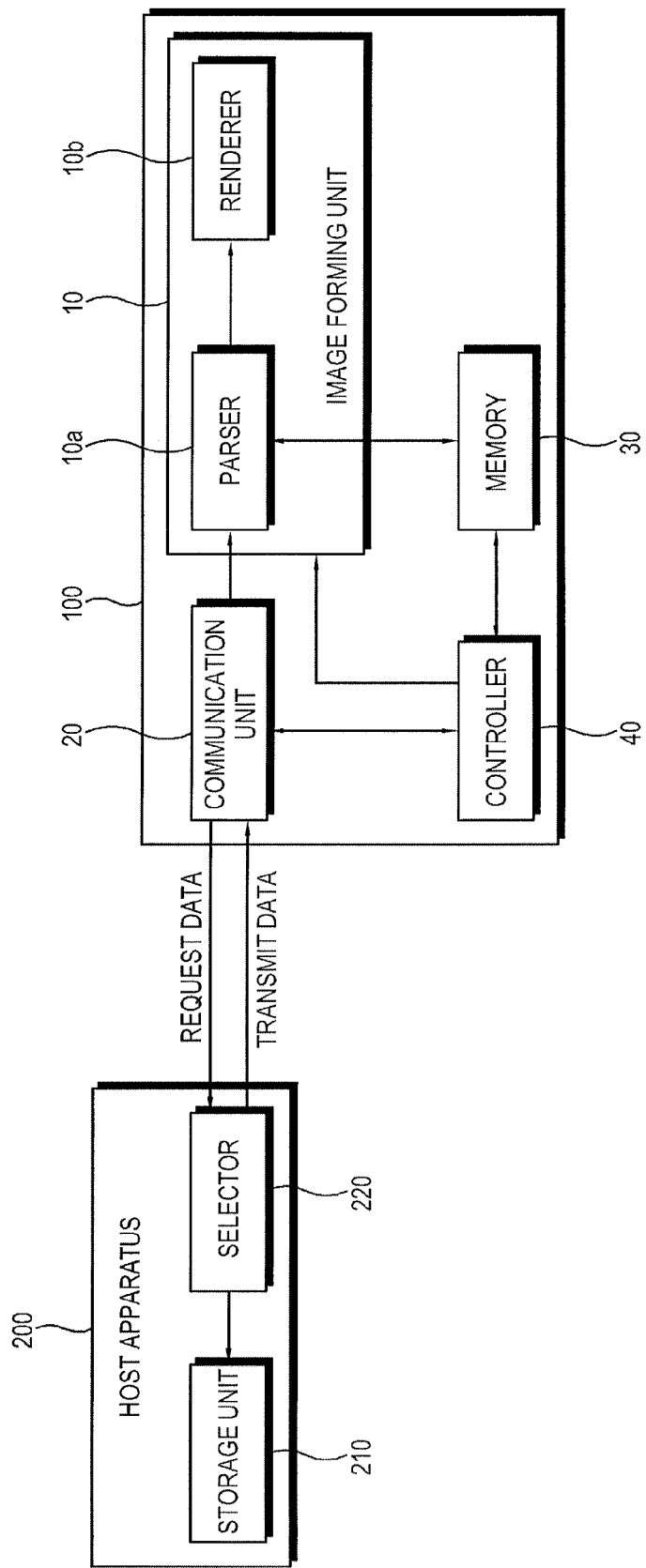

IMAGE FORMING APPARATUS AND PDF DOCUMENT DIRECT PRINTING METHOD THEREOF

CROSS-REFERENCE TO RELATED APPLICATIONS

This application claims priority under 35 U.S.C. §119(a) from Korean Patent Application No. 10-2007-0118073, filed on Nov. 19, 2007, in the Korean Intellectual Property Office, the disclosure of which is incorporated herein in its entirety by reference.

BACKGROUND OF THE INVENTION

1. Field of the Invention

The present general inventive concept relates to an image forming apparatus and a PDP (portable document format) document direct printing method thereof, and more particularly, to an image forming apparatus to form an image without a printer driver of a host apparatus, and a PDF direct printing method thereof.

2. Description of the Related Art

An image forming apparatus forms an image on a record medium based on print data. Among image forming methods of the image forming apparatus, direct printing is widely used since the direct printing transmits unprocessed print data directly to the image forming apparatus, does not require a driver and has a speedy transmission rate.

The image forming apparatus directly prints TIFF and JPG formats having images and PDF formats having documents. As illustrated in FIG. 1A, a PDF document 101 includes a header 110, a body 120, a cross reference table 130 and a trailer 140.

The header 110 of the PDF document 101 stores a version of the PDF document 101 while the body 120 includes at least one object 121 presenting document content. The cross reference table 130 stores an offset of each object 121 in the document, and the trailer 140 transmits information about the cross reference table 130 to an application.

FIG. 1B illustrates a conventional direct printing process. If a PDF document 102 is received, the image forming apparatus stores the PDF document 102 in a storage unit 150, as determined data 160, if a determination is made that the received document is direct-printable. If the image forming apparatus does not include an auxiliary storage unit such as a hard disk, a main memory stores the document 102. A parser parses the stored document as parse data 170 and a renderer converts the parsed document into rendered data 180 as an image and prints the document corresponding to print data 190.

As each of the objects in the PDF document 102 is stored in a predetermined order, the conventional image forming apparatus should have a memory having a larger capacity than the size of the PDF document 102 to parse and print the PDF document 102. Thus, if the image forming apparatus does not include the auxiliary storage unit or an available capacity of the main memory is smaller than the size of the PDF document, the PDF document 102 may not be printed. Then, a user should find a host apparatus having an application or print the PDF document from another image forming apparatus.

SUMMARY OF THE INVENTION

The present general inventive concept provides an image forming apparatus to print a PDF document even if a size of a PDF document is larger than an available capacity of a memory, and a PDF document direct printing method thereof.

The present general inventive concept also provides an image forming apparatus to perform a direct printing without an auxiliary storage device, and a PDF document direct printing method thereof.

Additional aspects and/or utilities of the present general inventive concept will be set forth in part in the description which follows and, in part, will be obvious from the description, or may be learned by practice of the present general inventive concept.

The foregoing and/or other aspects and utilities of the present general inventive concept may be achieved by providing a PDF (portable document format) document direct printing method of an image forming apparatus having a memory, the method comprising comparing a size of the PDF document with an available capacity of the memory, transmitting the PDF document that is larger than the available capacity of the memory to at least one external device if a determination is made that the size of the PDF document is larger than the available capacity of the memory, and receiving the PDF document from the external device, and forming an image corresponding to the received PDF document.

The forming the image may comprise parsing and rendering the PDF document.

The transmitting the PDF document may comprise determining an available capacity of a memory provided in the external device before transmitting the PDF document thereto.

The transmitting the PDF document may further comprise receiving an IP (internet protocol) address of the external device and memory information about the PDF document transmitted to the external device, from the external device.

The memory information may comprise a start offset and an end offset of the PDF document transmitted to the external device.

The method may further comprise displaying the start offset and the end offset through at least one of the external device and the image forming apparatus.

The transmitting the PDF document to the external device may comprise transmitting the PDF document to a host apparatus if the PDF document is received from the host apparatus connected to the image forming apparatus.

The method may further comprise displaying through a user interface (UI) that the PDF document is received from the host apparatus to form an image.

The foregoing and/or other aspects and utilities of the present general inventive concept may also be achieved by providing an image forming apparatus having a memory and direct-prints a PDF (portable document format) document, the image forming apparatus comprising a communication unit to communicate with at least one external device connected to the image forming apparatus, an image forming unit to form an image based on print data, and a controller to transmit the PDF document that is larger than an available capacity of the memory to at least one external device if a determination is made that a size of the PDF document is larger than the available capacity of the memory, and controls the image forming unit to receive the PDF document from the external device and to form an image corresponding to the received PDF format.

The image forming unit may parse and render the PDF document.

The controller may determine an available capacity of a memory provided in the external device before transmitting the PDF document thereto.

The controller may receive an IP (internet protocol) address of the external device and memory information about print data transmitted to the external device, from the external device.

The memory information may comprise a start offset and an end offset of the PDF document transmitted to the external device.

The controller may display the start offset and the end offset through at least one of the external device and the image forming apparatus.

The controller may transmit the PDF document to a host apparatus if the PDF document is received from the host apparatus connected to the image forming apparatus.

The controller may display through a user interface (UI) that the PDF document is received from the host apparatus to form an image.

The foregoing and/or other aspects and utilities of the general inventive concept may also be achieved by providing an image forming system including a plurality of external devices having external memory, an image forming apparatus having an image forming unit to form an image based on print data, memory, and a communication unit to communicate with the plurality of external devices, and a controller to determine whether a size of a PDF (portable document format) document is larger than the memory of the image forming apparatus and the external memory of the plurality of external devices, and to store data of the PDF document to one or more of the memory and the external memory based on the determination.

The memory of the image forming apparatus may include a main memory and an auxiliary memory.

The controller may store the data of the PDF document to the external memory of one or more of the external devices when a determination is made that the size of the PDF document is greater than the available memory of the image forming apparatus.

The controller may store a one portion of the data of the PDF document to the external memory of one or more of the external devices and an other portion of the data of the PDF document to the memory of the image forming apparatus when a determination is made that the size of the PDF document is greater than the available memory of the image forming apparatus and the available external memory of the external devices.

The controller may control the image forming unit to receive the data from one or more of the external devices to form an image corresponding to the received data.

The foregoing and/or other aspects and utilities of the general inventive concept may also be achieved by providing a storing method of data of a PDF document of an image forming system, the method including comparing a size of the PDF document with available memory of an image forming apparatus and external memory of one or more external devices, determining whether a size of the PDF document is larger than the available memory of the image forming apparatus and the available external memory of the one or more external devices, and storing the data of the PDF document to one or more of the memory of image forming apparatus and the external memory of the one or more external devices based on the determination.

The foregoing and/or other aspects and utilities of the general inventive concept may also be achieved by providing a computer-readable recording medium having embodied thereon a computer program to execute a method, wherein the method comprises comparing a size of a PDF document with available memory of an image forming apparatus and external memory of one or more external devices, determining whether a size of the PDF document is larger than the available memory of the image forming apparatus and the available external memory of the one or more external devices, and storing data of the PDF document to one or more of the memory of image forming apparatus and the external memory of the one or more external devices based on the determination.

BRIEF DESCRIPTION OF THE DRAWINGS

The above and/or other aspects of the present general inventive concept will become apparent and more readily appreciated from the following description of the embodiments, taken in conjunction with the accompanying drawings of which:

FIG. 1A illustrates a PDF document;

FIG. 1B illustrates a process of printing a PDF document through a direct printing by a conventional image forming apparatus;

FIG. 3A illustrates an IP address and an offset of print data stored by the image forming apparatus according to the present general inventive concept;

FIG. 3B illustrates a process of transmitting print data to a host apparatus and forming an image by the image forming apparatus according to the present general inventive concept.

DETAILED DESCRIPTION OF THE PREFERRED EMBODIMENTS

Figure 2:
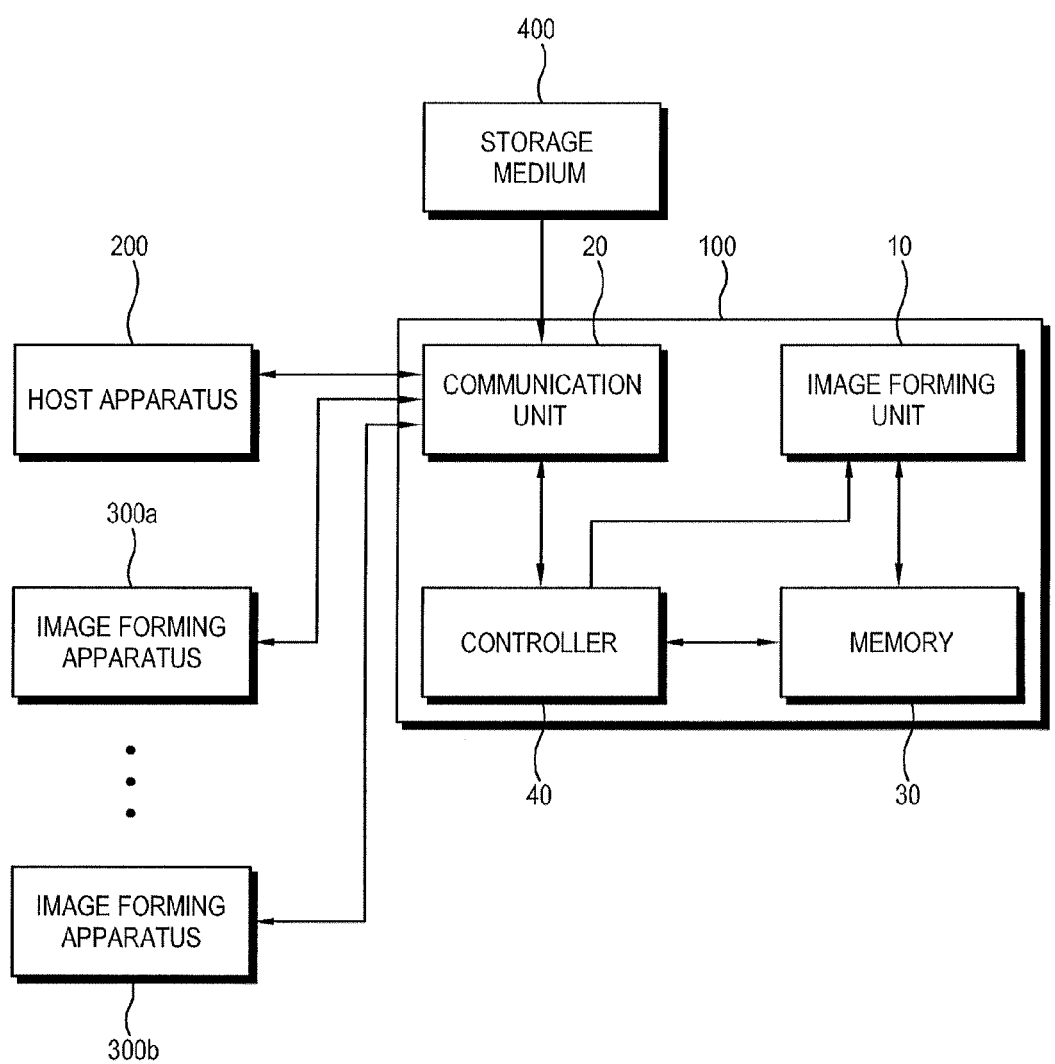
FIG. 2 is a block diagram of an image forming apparatus according to the present general inventive concept.

Hereinafter, exemplary embodiments of present general inventive concept will be described with reference to accompanying drawings, wherein like numerals refer to like elements and repetitive descriptions will be avoided as necessary.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Hereinafter, an image forming apparatus and a PDF document direct printing method thereof according to various embodiments of the present general inventive concept will be described with reference to FIGS. 1 to 4.

FIG. 2 is a block diagram illustrating an image forming apparatus according to an embodiment of the present embodiment. As illustrated therein, an image forming apparatus 100 according to the present embodiment includes an image forming unit 10, a communication unit 20, a memory 30 and a controller 40.

The image forming unit 10 forms an image on a record medium based on print data. The image forming unit 10 according to the present embodiment may include a photosensitive body (not illustrated) to form an electrostatic latent image thereon, a developing unit (not illustrated) to develop a developer on the photosensitive body and a transfer unit (not illustrated) to transfer the developer from the photosensitive body to a print paper to form an image thereon.

The image forming unit 10 according to the present embodiment may include a renderer to render data required to print data on a record medium and a parser to parse image formats such as JPEG and TIFF files, text files and PDF files to thereby perform a direct printing.

The communication unit 20 communicates with at least one external device connected to the image forming apparatus 100. The communication unit 20 according to the present embodiment may perform wireless communication by a Bluetooth or wireless LAN module as well as wired communication. The external device which is connected to the image forming apparatus 100 may include a server (not illustrated) connected to a host apparatus 200 and the image forming apparatus 100 as well other image forming apparatuses 300a . . . 300n connected through a network.

The communication unit 20 may receive a PDF document from a storage medium 400. If the communication unit 20 receives the PDF document from the storage medium 400, the PDF document may be directly printed instead of by the host apparatus 200. The storage medium 400 may include a USB memory stick or a memory card to store the PDF document therein.

The memory 30 stores therein a PDF document. The memory 30 according to the present embodiment includes a main memory (not illustrated) to store various information therein to form an image, and may selectively include an auxiliary memory such as a hard disk.

If a determination is made that a size of the PDF document is larger than an available capacity of the memory 30, the controller 40 transmits the PDF document that is larger than the available capacity of the memory 30 to at least one external device, and controls the image forming unit 10 to receive the PDF document from the external device and form an image.

If the image forming apparatus 100 includes an auxiliary memory, the controller 40 according to the present embodiment determines an available capacity of the auxiliary memory first. If a determination is made that the size of the PDF document is larger than the available capacity of the auxiliary memory, the controller 40 may determine whether the size of the PDF document is larger than an available capacity of the main memory.

If a determination is made that the size of the PDF document is larger than the available capacity of the memory 30, the controller 40 determines an available capacity of a memory included in at least one external device connected to the image forming apparatus 100.

More specifically, if the at least one external device connected to the image forming apparatus 100 includes other image forming apparatuses 300a . . . 300n, the controller 40 determines the available capacity of the memory included in the image forming apparatus 300a. If the size of the transmitted PDF document is smaller than the available capacity of the memory included in the image forming apparatus 300a, the controller 40 receives the PDF document stored in the image forming apparatus 300a and forms an image after forming an image with the PDF document stored in the memory 30.

If a determination is made that the size of the PDF document transmitted to the external device is larger than the available capacity of the memory included in the image forming apparatus 300a, the controller 40 stores only the PDF document corresponding to the available capacity of the memory of the image forming apparatus 300a and transmits the rest of the PDF document to another image forming apparatuses 300b . . . 300n.

As illustrated in FIG. 3A, while repeating the storing and transmitting processes, the controller 40 stores an IP address of the external device receiving the PDF document and an start offset and an end offset of the transmitted PDF document as a table, and then requests and receives data about the PDF document from the external device corresponding to the IP address to form an image by the image forming unit 30. The start offset and end offset of the PDF document may be displayed on a panel (not illustrated) of the image forming apparatus 100 or a display unit (not illustrated) of the host apparatus 200.

As each object of the PDF document is stored in a predetermined order, the controller 40 may remove the printed PDF document from the memory 30, sequentially receive a necessary PDF document from the external device to store the respective PDF document in the memory 30 and print the PDF document by using the offset stored as the table. Thus, even if the available capacity of the memory 30 in the image forming apparatus 100 is smaller than the size of the PDF document, the PDF document may be printed.

If the size of the PDF document is larger than the available capacity of the memory 30, the controller 40 may determine an available capacity of the memory in one of a plurality of image forming apparatuses 300 connected to the image forming apparatus 100 and selected by a user to print the PDF document.

According to another exemplary embodiment of the present general inventive concept, if the size of the PDF document is larger than the available capacity of the memory 30, the controller 30 may control to print the PDF document by using a storage unit 210 of the host apparatus 200 if the PDF document is received from the host apparatus 200, i.e., if a user is to print the PDF document with a DPU (direct printing utility) of the host apparatus 200 without a prompt command. Generally, as the storage unit 210 of the host apparatus 200 has a large capacity, the PDF document may not be divided to be stored in a plurality of external devices.

As illustrated in FIG. 3B, if a user transmits a printing command by using the DPU of the host apparatus 200 and if the size of the PDF document is larger than the available capacity of the memory 30, the controller 40 loads the PDF document on the storage unit 210 of the host apparatus 200. The controller 40 requests the host apparatus 200 through the communication unit 20 to transmit the PDF document to be parsed by a parser 10a of the image forming unit 10. A selector 220 of the host apparatus 200 then transmits the requested data to the image forming apparatus 100. The request and transmission of data is repeated until the printing process ends. Thus, the PDF document that is larger than the available capacity of the memory 30 may be printed. The controller 40 may display through a user interface (UI) that the PDF document is printed by using the storage unit 210 of the host apparatus 200. The UI may be displayed on the host apparatus 200, too.

Figure 4:
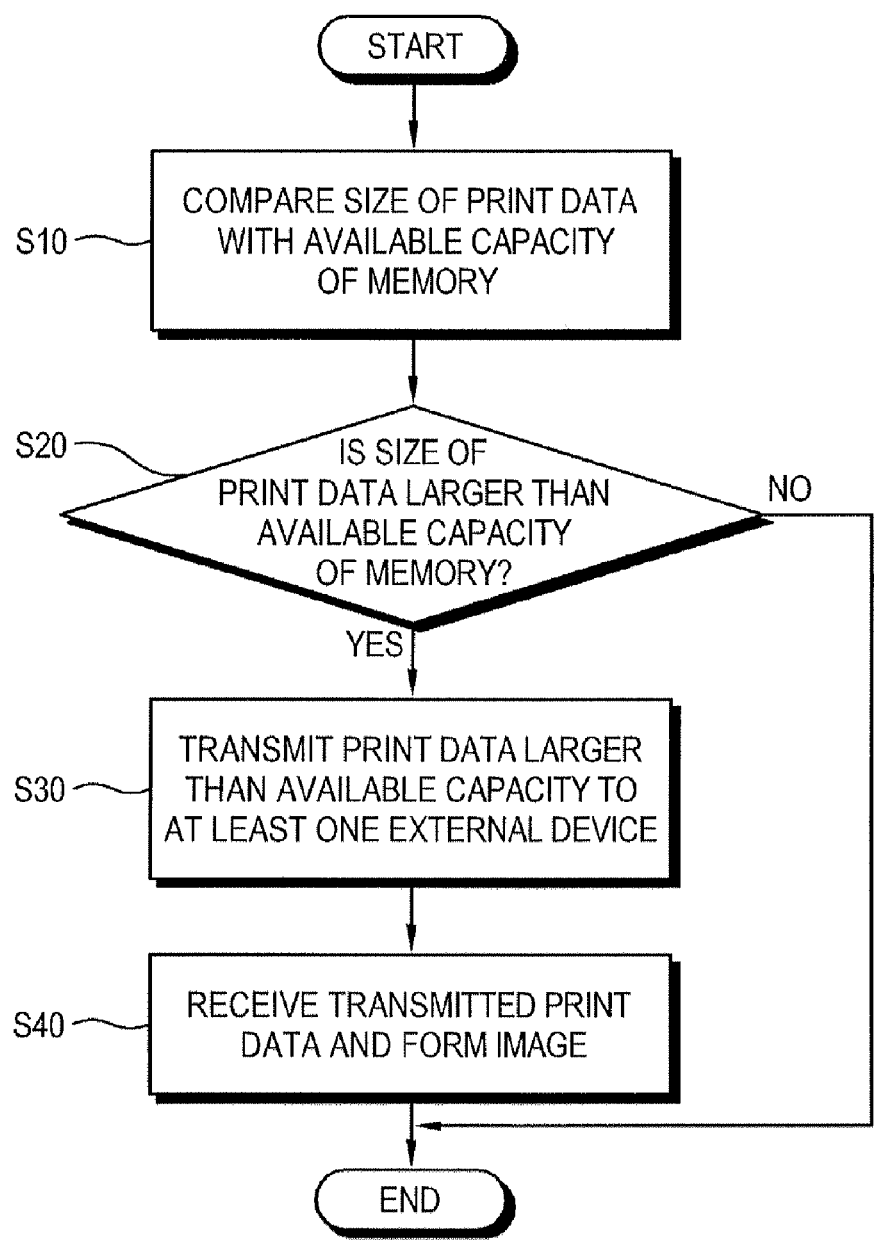
FIG. 4 is a flowchart to describe a PDF document direct printing method of the image forming apparatus according to the present general inventive concept.

Hereinafter, a PDF document direct printing method of the image forming apparatus 100 according to an embodiment of the present general inventive concept will be described with reference to FIG. 4.

The controller 40 compares the size of the PDF document with the available capacity of the memory 30 (operation S10). If a determination is made that the size of the PDF document is larger than the available capacity of the memory 30 (operation S20), the controller 40 transmits the PDF document that is larger than the available capacity, to at least one external device (operation S30).

The operation S30 may further include an operation of determining an available capacity of the memory included in the external device and an operation of receiving the IP address of the external device and memory information about the PDF document transmitted to the external device from the external device. The memory information may include the start offset and end offset of the PDF document transmitted to the external device.

The controller 40 receives the transmitted PDF document and forms an image (operation S40). If the PDF document is received from the host apparatus 200, the controller 40 may receive the PDF document from the host apparatus 200 and form an image after transmitting the PDF document that is larger than the available capacity of the memory 30 to the storage unit 210 of the host apparatus 200.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, an image forming apparatus and a PDF document direct printing method thereof according to various embodiment of the present general inventive concept may print a PDF document even if a size of the PDF document is larger than an available capacity of a memory.

Also, an image forming apparatus and a PDF document direct printing method thereof according to an embodiment of the present general inventive concept may perform a direct printing without an auxiliary storage device.

Although various exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A PDF (portable document format) document direct printing method of an image forming apparatus having a memory, the method comprising:
    comparing a size of the PDF document with an available capacity of the memory;
    storing at least a first portion of the PDF document in the memory if a determination is made that the size of the PDF document is larger than the available capacity of the memory;
    transmitting a remaining portion of the PDF document to at least one external device if the determination is made that the size of the PDF document is larger than the available capacity of the memory;
    receiving the remaining portion of the PDF document from the at least one external device; and
    forming an image corresponding to the stored at least first portion of the PDF document and the received remaining portion of the PDF document.

2. The method according to claim 1, wherein the forming the image comprises:
    parsing and rendering the PDF document.

3. The method according to claim 1, wherein the transmitting the PDF document comprises:
    determining an available capacity of a memory provided in the external device before transmitting the PDF document thereto.

4. The method according to claim 1, wherein the transmitting the PDF document further comprises:
    receiving an IP (internet protocol) address of the external device and memory information about the PDF document transmitted to the external device, from the external device.

5. The method according to claim 4, wherein the memory information comprises:
    a start offset and an end offset of the PDF document transmitted to the external device.

6. The method according to claim 5, further comprising:
    displaying the start offset and the end offset through at least one of the external device and the image forming apparatus.

7. The method according to claim 1, wherein the transmitting the PDF document to the external device comprises:
    transmitting the PDF document to a host apparatus if the PDF document is received from the host apparatus connected to the image forming apparatus.

8. The method according to claim 7, further comprising:
    displaying through a user interface (UI) that the PDF document is received from the host apparatus to form an image.

9. The method according to claim 1, wherein the at least one external device is another image forming device.

10. An image forming apparatus configured to directly-print a PDF (portable document format) document, the image forming apparatus comprising:
    a communication unit to communicate with at least one external device connected to the image forming apparatus;
    a memory to store at least a first portion of the PDF document if a determination is made that a size of the PDF document is larger than the available capacity of the memory;
    an image forming unit to form an image based on print data; and
    a controller to transmit a remaining portion of the PDF document to at least one external device if the determination is made that a size of the PDF document is larger than the available capacity of the memory, and to control the image forming unit to receive the remaining portion of the PDF document from the at least one external device and to form an image corresponding to the stored at least first portion of the PDF document and the received remaining portion of the PDF document.

11. The image forming apparatus according to claim 10, wherein the controller determines an available capacity of a memory provided in the external device before transmitting the PDF document thereto.

12. The image forming apparatus according to claim 10, wherein the controller receives an IP (internet protocol) address of the external device and memory information about print data transmitted to the external device, from the external device.

13. The image forming apparatus according to claim 12, wherein the memory information comprises:
    a start offset and an end offset of the PDF document transmitted to the external device.

14. The image forming apparatus according to claim 13, wherein the controller displays the start offset and the end offset through at least one of the external device and the image forming apparatus.

15. The image forming apparatus according to claim 10, wherein the controller transmits the PDF document to a host apparatus if the PDF document is received from the host apparatus connected to the image forming apparatus.

16. The image forming apparatus according to claim 15, wherein the controller displays through a user interface (UI) that the PDF document is received from the host apparatus to form an image.

17. The image forming apparatus according to claim 10, wherein the at least one external device is another image forming device.

18. The image forming apparatus according to claim 10, wherein the image forming unit parses and renders the PDF document.

19. An image forming system, comprising:
    a plurality of external devices having external memory;
    an image forming apparatus having an image forming unit to form an image based on print data, memory, and a communication unit to communicate with the plurality of external devices; and
    a controller to determine whether a size of a PDF (portable document format) document is larger than the memory of the image forming apparatus and the external memory of the plurality of external devices, and to store data of the PDF document to one or more of the memory and the external memory based on the determination, wherein the controller stores at least one portion of the data of the PDF document to the external memory of one or more of the external devices and at least one other portion of the data of the PDF document to the memory of the image forming apparatus when a determination is made that the size of the PDF document is greater than the available memory of the image forming apparatus and the available external memory of the external devices.

20. The system according to claim 19, wherein the memory of the image forming apparatus comprises:
    a main memory; and
    an auxiliary memory.

21. The system according to claim 19, wherein the controller controls the image forming unit to receive the data from one or more of the external devices to form an image corresponding to the received data.

22. A storing method of data of a PDF (portable document format) document of an image forming system, the method comprising:
    comparing a size of the PDF document with available memory of an image forming apparatus and external memory of one or more external devices;
    determining whether a size of the PDF document is larger than the available memory of the image forming apparatus and the available external memory of the one or more external devices; and
    storing at least a first portion of the data of the PDF document to the memory of image forming apparatus and a remaining portion of the data of the PDF document to the external memory of the one or more external devices based on the determination.

23. A non-transitory computer-readable recording medium having embodied thereon a computer program to execute a method, wherein the method comprises:
    comparing a size of a PDF (portable document format) document with available memory of an image forming apparatus and external memory of one or more external devices;
    determining whether a size of the PDF document is larger than the available memory of the image forming apparatus and the available external memory of the one or more external devices; and
    storing at least a first portion of data of the PDF document to the memory of image forming apparatus and a remaining portion of the data of the PDF document to the external memory of the one or more external devices based on the determination.

* * * * *